(12) United States Patent
Kurosaki et al.

(10) Patent No.: US 10,738,877 B2
(45) Date of Patent: Aug. 11, 2020

(54) LUBRICATING STRUCTURE

(71) Applicant: TOYOTA JIDOSHA KABUSHIKI KAISHA, Toyota-shi, Aichi-ken (JP)

(72) Inventors: Yuki Kurosaki, Susono (JP); Hiroyuki Shioiri, Yokohama (JP); Mitsuaki Tomita, Susono (JP); Shotaro Kato, Shizuoka-ken (JP); Hiroyuki Shibata, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 268 days.

(21) Appl. No.: 15/710,263

(22) Filed: Sep. 20, 2017

(65) Prior Publication Data

US 2018/0087653 A1 Mar. 29, 2018

(30) Foreign Application Priority Data

Sep. 23, 2016 (JP) .................................. 2016-185943

(51) Int. Cl.

| | |
|---|---|
| *F16H 57/04* | (2010.01) |
| *B60K 6/445* | (2007.10) |
| *B60K 6/365* | (2007.10) |
| *B60K 6/383* | (2007.10) |
| *F16D 41/08* | (2006.01) |

(52) U.S. Cl.
CPC ......... *F16H 57/0424* (2013.01); *B60K 6/365* (2013.01); *B60K 6/383* (2013.01); *B60K 6/445* (2013.01); *F16H 57/0436* (2013.01); *F16H 57/0476* (2013.01); *F16H 57/0484* (2013.01); *F16D 41/084* (2013.01); *F16D 2300/06* (2013.01)

(58) Field of Classification Search
None
See application file for complete search history.

(56) References Cited

U.S. PATENT DOCUMENTS

| | | | | |
|---|---|---|---|---|
| 5,135,085 | A | * 8/1992 | Kinoshita | ............. F16D 41/067 |
| | | | | 192/113.1 |
| 5,449,057 | A | * 9/1995 | Frank | ...................... F16D 41/12 |
| | | | | 192/108 |
| 5,964,331 | A | * 10/1999 | Reed | ..................... F16D 41/125 |
| | | | | 192/113.32 |

(Continued)

FOREIGN PATENT DOCUMENTS

JP 2015-077846 A 4/2015

*Primary Examiner* — Mark A Manley
(74) *Attorney, Agent, or Firm* — Hunton Andrews Kurth LLP

(57) ABSTRACT

A selectable one-way clutch includes a pocket plate, a notch plate, and a selector plate, and the selector plate is configured to rotate so as to switch the clutch between an engaged state and a non-engaged state. A lubricant passage through which a lubricant is supplied to the selectable one-way clutch has a lubricant inlet and a lubricant outlet, and the lubricant outlet is located on the lower side of the lubricant inlet in a direction of gravitational force, and connected to an inside of the selectable one-way clutch. The lubricant passage includes an inclined surface that is inclined with respect to the direction of gravitational force, between the lubricant inlet and the lubricant outlet, and the inclined surface has an opening.

5 Claims, 8 Drawing Sheets

(56) References Cited

U.S. PATENT DOCUMENTS

| | | | | |
|---|---|---|---|---|
| 6,290,044 B1* | 9/2001 | Burgman | ............... | F16D 41/18 |
| | | | | 188/82.3 |
| 9,188,174 B2 | 11/2015 | Beiser et al. | | |
| 2015/0105205 A1* | 4/2015 | Kurosaki | ............... | B60K 6/445 |
| | | | | 475/5 |
| 2016/0250917 A1 | 9/2016 | Shibata et al. | | |

* cited by examiner

LUBRICATING STRUCTURE

INCORPORATION BY REFERENCE

The disclosure of Japanese Patent Application No. 2016-185943 filed on Sep. 23, 2016 including the specification, drawings and abstract is incorporated herein by reference in its entirety.

BACKGROUND

1. Technical Field

The disclosure relates to a lubricating structure.

2. Description of Related Art

A hybrid vehicle (HV vehicle) that includes an engine and a motor as power sources, and is able to travel in an EV mode only with the motor while stopping the engine, is known. For example, a power transmission system of a hybrid vehicle disclosed in Japanese Patent Application Publication No. 2015-77846 (JP 2015-77846 A) includes a selectable one-way clutch as a lock mechanism, in a housing case (rear case).

The selectable one-way clutch is attached to a rotating member, and includes a pocket plate, a notch plate, and a selector plate, which are arranged side by side in an axial direction of the rotating member. By rotating the selector plate by means of an actuator, it is possible to switch the clutch between an engaged state in which struts (engagement pieces) of the pocket plate are engaged with notches (engagement recesses) of the notch plate, and a non-engaged state in which the struts are disengaged from the notches. In the engaged state, torque is transmitted between the pocket plate and the notch plate. In the non-engaged state, torque is not transmitted between the pocket plate and the notch plate.

In the selectable one-way clutch as described above, the selector plate, and the pocket plate or the notch plate rotate relative to each other while sliding. A lubricant or lubricating oil is supplied into the selectable one-way clutch, so that the respective plates can smoothly rotate relative to each other.

SUMMARY

As described above, the respective plates of the selectable one-way clutch are configured to rotate relative to each other; therefore, when the notch plate is rotated in a condition where the pocket plate is fixed, for example, torque acts on the selector plate disposed between the pocket plate and the notch plate, via the lubricant. This action is a dragging action due to shear force produced based on the viscosity of the lubricant, and larger torque (dragging torque) acts on the selector plate as the viscosity of the lubricant is higher.

When the temperature of the lubricant supplied to the selectable one-way clutch is lower than that in normal traveling conditions, such as when the engine is started, the viscosity of the lubricant is higher than that in the case of normal traveling conditions; therefore, the dragging torque acting on the selector plate is larger than that in the case of normal traveling conditions. As a result, the selector plate is rotated by the dragging torque, and the pocket plate and the notch plate, which should be in the non-engaged state, may be erroneously engaged.

This disclosure is to reduce or eliminate the possibility of erroneous engagement of a selectable one-way clutch while lubricating the clutch.

An aspect of the disclosure is concerned with a lubricating structure. The lubricating structure includes a selectable one-way clutch, and a lubricant passage. The selectable one-way clutch includes a pocket plate, a notch plate, and a selector plate. The pocket plate is attached to a case. The notch plate is attached to a rotating member connected to an output shaft of a power source of a vehicle. The selector plate is provided between the pocket plate and the notch plate. The selector plate is configured to rotate so as to switch the selectable one-way clutch between an engaged state and a non-engaged state. The engaged state is a state in which torque is transmitted between the pocket plate and the notch plate. The non-engaged state is a state in which torque is not transmitted between the pocket plate and the notch plate. The pocket plate, the notch plate, and the selector plate are arranged side by side in an axial direction of the rotating member. The lubricant passage through which a lubricant is supplied to the selectable one-way clutch has a lubricant inlet and a lubricant outlet. The lubricant outlet is located on a lower side of the lubricant inlet in a direction of gravitational force, and connected to an inside of the selectable one-way clutch. The lubricant passage includes an inclined surface between the lubricant inlet and the lubricant outlet, and the inclined surface is inclined with respect to the direction of gravitational force and has an opening.

With the above arrangement, high-viscosity lubricant that flows from the lubricant inlet flows along the inclined surface, and is discharged to the outside of the lubricant passage, through the opening formed in the inclined surface, because of its high viscosity. On the other hand, low-viscosity lubricant that flows from the lubricant inlet flows along the inclined surface, passes over the opening because of its low viscosity, and reaches the lubricant outlet, to be supplied into the selectable one-way clutch. As a result, it is possible to reduce or eliminate the possibility of erroneous engagement of the selectable one-way clutch, while lubricating the clutch.

In the lubricating structure as described above, the lubricant passage may be provided with a first protruding portion in the vicinity of an opening end of the opening. The first protruding portion may protrude from the inclined surface on one side of the opening closer to the lubricant inlet, toward an inside of the lubricant passage.

With the above arrangement, the high-viscosity lubricant flows along the first protruding portion, and is guided to the opening, so that the lubricant can be easily discharged to the outside of the lubricant passage through the opening. On the other hand, the low-viscosity lubricant passes over the opening, after flowing along the first protruding portion. Thus, the low-viscosity lubricant is less likely or unlikely to be discharged through the opening, and a larger amount of the low-viscosity lubricant is supplied into the selectable one-way clutch.

In the lubricating structure as described above, the lubricant passage may be provided with a second protruding portion in the vicinity of the opening end of the opening. The second protruding portion may protrude from the inclined surface on the other side of the opening closer to the lubricant outlet, toward the inside of the lubricant passage. A distance between a plane and a distal end of the second protruding portion may be smaller than a distance between the plane and a distal end of the first protruding portion. The plane may include the opening end of the opening With the above arrangement, even if a part of the high-viscosity lubricant passes over the opening, it is blocked and retained by the second protruding portion, and is less likely or unlikely to be supplied into the selectable one-way clutch.

Thus, the part of the high-viscosity lubricant thus blocked and retained is discharged through the opening. Also, a possibility that the low-viscosity lubricant that has passed over the opening by use of the first protruding portion collides with the second protruding portion is reduced.

In the lubricating structure as described above, a height from the lubricant outlet to an opening end of the opening which is closest to the lubricant outlet as measured in the direction of gravitational force may be set such that a first hydraulic pressure value is larger than a second hydraulic pressure value. The first hydraulic pressure value may be a value of a hydraulic pressure generated by the lubricant accumulated between the lubricant outlet and the opening in the lubricant passage. The second hydraulic pressure value may be a maximum value of the hydraulic pressure of the lubricant generated within the selectable one-way clutch, due to a difference between a rotational speed of the pocket plate and a rotational speed of the notch plate when the selectable one-way clutch is in the non-engaged state.

With the above arrangement, even when the hydraulic pressure generated within the selectable one-way clutch is equal to the maximum value, the low-viscosity lubricant accumulated in the lubricant passage is supplied into the selectable one-way clutch.

With this disclosure, in the lubricant passage, the high-viscosity lubricant that has flowed from the lubricant inlet drops, and flows along the inclined surface located on the lower side of the inlet in the direction of gravitation force. Then, when the lubricant reaches the opening formed in the inclined surface, it flows along an inner wall of the opening because of its high viscosity, and is discharged to the outside of the lubricant passage through the opening. On the other hand, the low-viscosity lubricant that has flowed from the lubricant inlet flows along the inclined surface, passes over the opening because of its low viscosity, and reaches the lubricant outlet, to be supplied into the selectable one-way clutch connected to the lubricant outlet. Thus, the high-viscosity lubricant is significantly restricted from being supplied into the selectable one-way clutch, while the low-viscosity lubricant is supplied into the selectable one-way clutch. Therefore, it is possible to reduce or eliminate the possibility of erroneous engagement of the selectable one-way clutch while lubricating the clutch.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
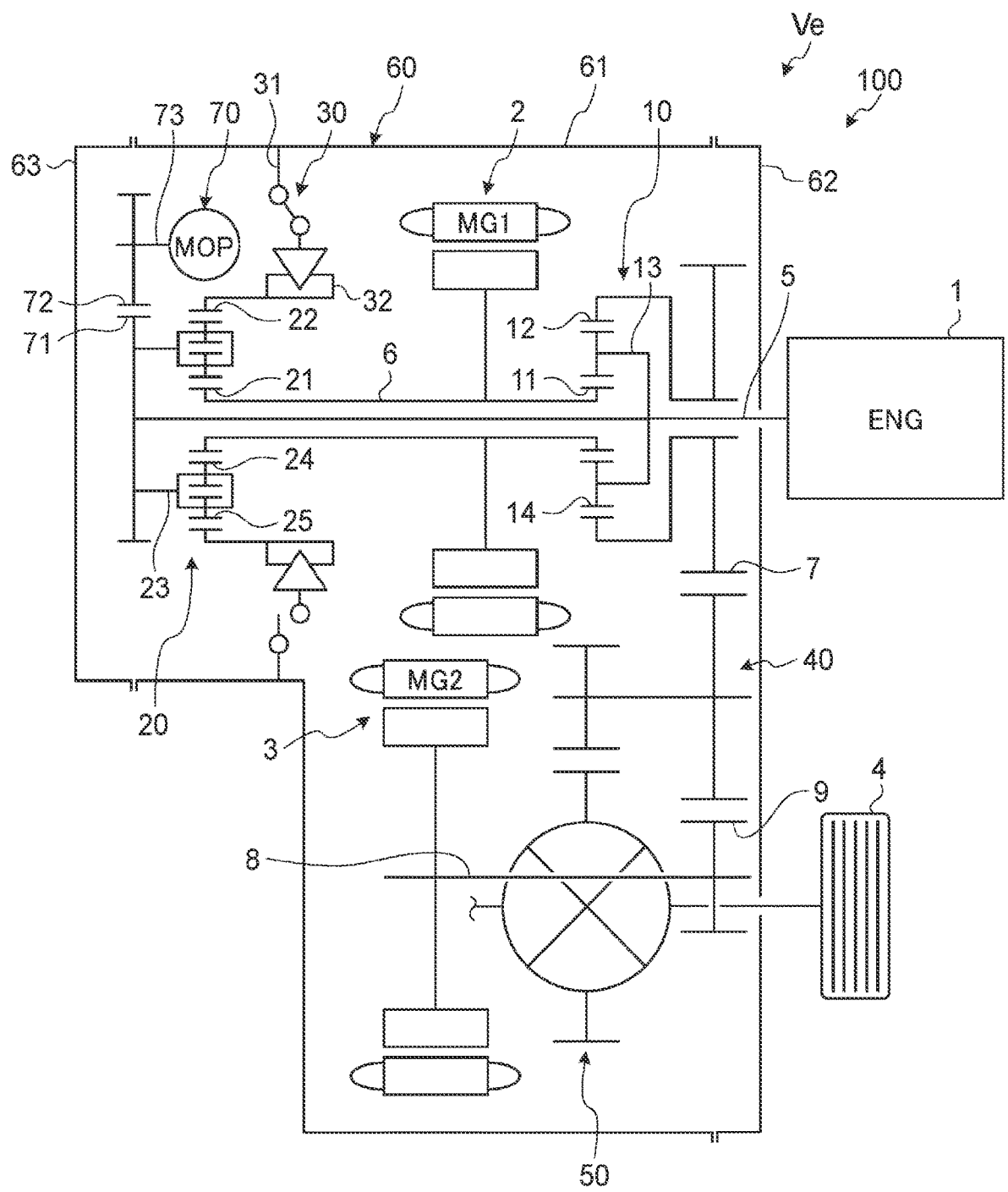
FIG. 1 is a skeleton diagram of a power transmission system of a vehicle provided with a lubricating structure for a selectable one-way clutch according to a first embodiment.

Some embodiments of the disclosure will be described in detail with reference to the drawings. It is to be understood that this disclosure is not limited to these embodiments. In the drawings, the same reference numerals are suitably assigned to the same or corresponding constituent elements, of which explanation will not be repeated.

FIG. 1 is a skeleton diagram of a power transmission system of a vehicle in which a lubricating structure for a selectable one-way clutch according to a first embodiment is provided. The power transmission system 100 of the vehicle Ve includes an engine (ENG) 1 as a power source for running the vehicle, first motor (MG1) 2, second motor (MG2) 3, first planetary gear train 10 as a power split device, second planetary gear train 20 as a speed changing unit, selectable one-way clutch (which will be called "SOWC") 30 as a gear lock mechanism, counter gear mechanism 40, and a differential gear mechanism 50. The engine 1 is provided by a known internal combustion engine. The first motor 2 and the second motor 3 are known motor-generators each having a motoring function and a power generating function, and are electrically connected to a battery (not shown) via an inverter (not shown).

In the power transmission system 100, power delivered from the engine 1 is divided by the first planetary gear train 10 and distributed to the first motor 2 and drive wheels 4. In particular, when power is transmitted from the engine 1 to the drive wheels 4, the SOWC 30 is placed in a locking state, and receives engine reaction force, so that the second planetary gear train 20 functions as a speed increasing machine. When the first motor 2 functions as a generator, using the power distributed to the first motor 2, electric power generated by the first motor 2 can be charged into the battery, or supplied to the second motor 3. The second motor 3 functions as a motor when it is supplied with electric power.

An input shaft 5 of the power transmission system 100 is coupled to an output shaft of the engine 1. The engine 1 is located outside a case 60 in which the first motor 2 and others are housed. In the case 60, the first motor 2, first planetary gear train 10, second planetary gear train 20, and the SOWC 30 are disposed on the same axis as the output shaft of the engine 1. Also, the second motor 3 and a mechanical oil pump (MOP) 70 are disposed on respective axes different from the output shaft of the engine 1. The mechanical oil pump 70 is an oil pump driven by the engine 1.

The first planetary gear train 10 is in the form of a single pinion type planetary gear train, and has a first sun gear 11, first ring gear 12 disposed concentrically with the first sun gear 11, and a first carrier 13 that holds pinion gears 14 that mesh with the first sun gear 11 and the first ring gear 12 such that the pinion gears 14 can rotate about themselves and rotate about the axis of the gear train 10. A first rotor shaft 6 of the first motor 2 is coupled to the first sun gear 11 such that the first rotor shaft 6 can rotate as a unit with the first sun gear 11. The first rotor shaft 6 is a hollow shaft, and the input shaft 5 is inserted within the shaft 6. The engine 1 is coupled to the first carrier 13. The first carrier 13 rotates as a unit with the input shaft 5. The first ring gear 12 is an output element that delivers torque from the first planetary gear train 10 toward the drive wheels 4, and rotates as a unit with an output gear 7.

The output gear 7 is coupled to the differential gear mechanism 50 via the counter gear mechanism 40. Torque delivered from the output gear 7 is transmitted to the right and left drive wheels 4, via the counter gear mechanism 40 and the differential gear mechanism 50.

In the power transmission system 100, torque delivered from the second motor 3 can be added to the torque transmitted from the output gear 7 to the drive wheels 4. The second motor 3 has a second rotor shaft 8 disposed in parallel with the input shaft 5. A reduction gear 9 that meshes with a counter driven gar of the counter gear mechanism 40 is mounted on the second rotor shaft 8, such that the reduction gear 9 rotates as a unit with the second rotor shaft 8.

The second planetary gear train 20 is in the form of a double pinion type planetary gear train, and has a second sun gear 21, a second ring gear 22 disposed concentrically with the second sun gear 21, and a second carrier 23 that holds two or more first pinion gears 24 and two or more second pinion gears 25 such that the gears 24, 25 can rotate about themselves and rotate about the axis of the gear train 20. The first pinion gears 24 mesh with the second sun gear 21, and the second pinion gears 25 mesh with the first pinion gears 24 and the second ring gear 22.

The first rotor shaft 6 of the first motor 2 is coupled to the second sun gear 21, such that the first rotor shaft 6 rotates as a unit with the second sun gear 21. The engine 1 is coupled to the second carrier 23. The second carrier 23 rotates as a unit with the input shaft 5. The second planetary gear train 20 and the first planetary gear train 10 are associated with each other, such that the second sun gear 21 rotates as a unit with the first sun gear 11, and the second carrier 23 rotates as a unit with the first carrier 13. The second ring gear 22 is a reaction force element that is selectively locked by the SOWC 30, and rotates as a unit with a notch plate 32 of the SOWC 30. The second ring gear 22 is connected to the output shaft of the engine 1 via the second pinion gears 25 and the second carrier 23.

The SOWC 30 is mounted around the second ring gear 22 as the above-mentioned rotating member. The SOWC 30 has a pocket plate 31 fixed to the case 60 (case body 61), and functions as a mechanism for holding engine reaction force by locking the second ring gear 22. The SOWC 30 switches between a locking state in which the rotational direction of the second ring gear 22 is restricted to only one direction (i.e., the second ring gear 22 can rotate only in one direction), and a non-locking state in which the second ring gear 22 can rotate in both directions. For example, when the SOWC 30 is in the locking state, the second ring gear 22 is inhibited from rotating in the positive direction. The positive direction is the same direction as a direction in which the crankshaft rotates while the engine 1 is being driven (namely, the rotational direction of the output shaft of the engine 1).

The case 60 has a cylindrical case body 61 that is open at the opposite sides, a front cover 62 as a cover member that covers an opening of the case body 61 closer to the engine 1, and a rear cover 63 as a cover member that covers an opening of the case body 61 opposite to or remote from the engine 1. The front cover 62 is bolted to one end portion (end portion closer to the engine 1) of the case body 61, and is integrated with the case body 61. The rear cover 63 is bolted to the other end portion (end portion opposite to the engine 1) of the case body 61, and is integrated with the case body 61.

The mechanical oil pump 70 has a pump drive gear 71, pump driven gear 72, and a pump shaft 73. The pump drive gear 71 rotates as a unit with the input shaft 5 and the second carrier 23, and meshes with the pump driven gear 72. The pump driven gear 72 is mounted on the pump shaft 73 such that the gear 72 rotates as a unit with the shaft 73. The pump shaft 73 is disposed on an axis different from the input shaft 5. In operation, oil discharged from the mechanical oil pump 70 is supplied, as a lubricant, to given parts (e.g., the first planetary gear train 10 and the second planetary gear train 20) which are located within the case 60 and are required to be lubricated.

Figure 2:
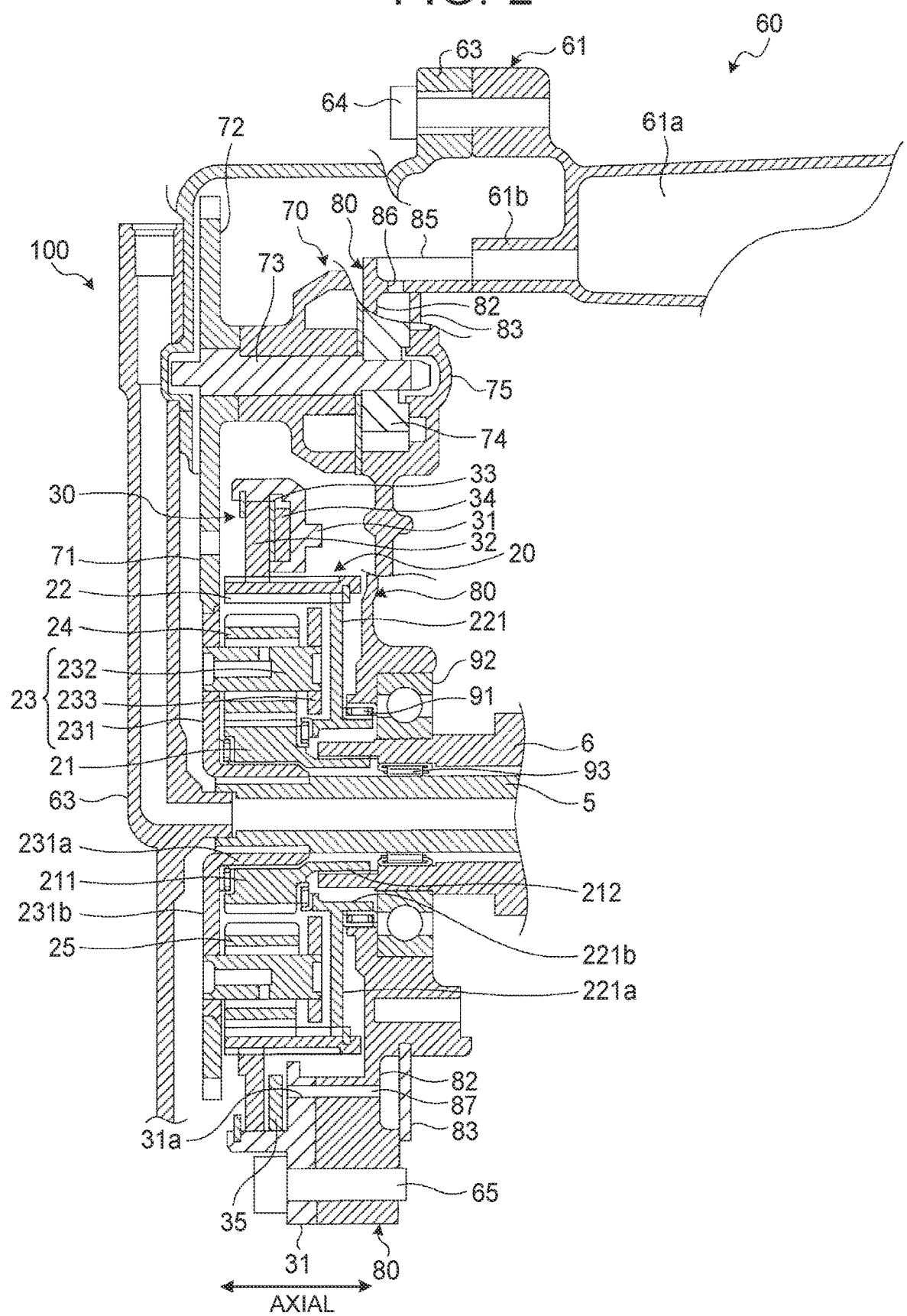
FIG. 2 is a cross-sectional view of a part of the power transmission system shown in FIG. 1.

FIG. 2 is a cross-sectional view of a part of the power transmission system 100 shown in FIG. 1. In the power transmission system 100, the second ring gear 22 of the second planetary gear train 20 is supported by the case body 61 via a center support 80. The case body 61 and the rear cover 63 are fastened with bolts 64.

The center support 80 is a support member that supports the rotating members in the case 60, and is fastened by bolts to an end portion (such as a flange portion) of the case body 61. When the power transmission system 100 is assembled, the center support 80 is fastened to the case body 61, and then the rear cover 63 is fastened to the case body 61. After the assembling, the center support 80 extends in radial directions so as to form a partition wall within the case 60. A through-hole is provided in a radially inner portion of the center support 80, and a bearing 91 that receives a radial load from a ring gear flange 221 is fitted in the through-hole. An outer race of the bearing 91 is fitted in the through-hole of the center support 80, and an inner race of the bearing 91 is fitted on the ring gear flange 221.

The ring gear flange 221 is a support member that supports the second ring gear 22, and is located on the radially inner side of the second ring gear 22. The ring gear flange 221 has a flange portion 221a that is spline-fitted at its outer periphery to the second ring gear 22, and a boss portion 221b that is fitted at its outer periphery to the bearing 91. The flange portion 221a extends radially outward from the boss portion 221b, and is provided between a carrier plate 233 of the second carrier 23 and the center support 80 as viewed in the axial direction. The boss portion 221b is positioned such that its distal end portion is inserted in the through-hole of the center support 80, and is attached to the center support 80 via the bearing 91.

A ball bearing 92 that supports the first rotor shaft 6, as well as the bearing 91, is fitted in the through-hole of the center support 80. Namely, the first rotor shaft 6 is supported by the center support 80. The ball bearing 92 is located closer to the engine 1 than the bearing 91. An outer race of the ball bearing 92 is fitted in the through-hole of the center support 80, and an inner race of the ball bearing 92 is fitted on the outer periphery of the first rotor shaft 6. Since the first rotor shaft 6 is a hollow shaft, the input shaft 5 is mounted, via a needle bearing 93, on the inner periphery of the first rotor shaft 6. In this connection, the above phrase "closer to the engine 1" means that the axial position of a subject is relatively on the engine 1 side (on the right-hand side in FIG. 2). A phrase "closer to the rear cover 63" below means that the axial position of a subject is relatively on the side opposite to the engine 1 (on the left-hand side in FIG. 2).

The first rotor shaft 6 extends toward the rear cover 63, beyond its portion on which the ball bearing 92 and the needle bearing 93 are fitted, and its distal portion is located in the vicinity of a gear portion 211 of the second sun gear 21. The second sun gear 21 is spline-fitted to the distal end portion of the first rotor shaft 6. The second sun gear 21 has the gear portion 211, and a boss portion 212. The gear portion 211 is located closer to the rear cover 63 than the distal end portion of the first rotor shaft 6. The boss portion 212 protrudes from a radially inner portion of the gear portion 211 toward the engine 1 in the axial direction, and the protruding portion is spline-fitted in the inner periphery of the first rotor shaft 6. A portion (first splined portion) in which the second sun gear 21 and the first rotor shaft 6 are spline-fitted to each other is located closer to the engine 1 than a portion (second splined portion) in which the input shaft 5 and the second carrier 23 are spline-fitted to each other.

The input shaft 5 has a distal end portion that protrudes from the first rotor shaft 6 toward the rear cover 63, and the second carrier 23 is splined-fitted on the protruding portion of the input shaft 5. The second carrier 23 has an annular carrier body 231, pinion shafts 232, and a disc-shaped carrier plate 233. The carrier body 231 consists of a boss portion 231a formed in its radially inner portion, and a carrier flange portion 231b that extends radially outward from one axial end of the boss portion 231a closer to the rear cover 63. The boss portion 231a is spline-fitted on the outer periphery of the input shaft 5. The carrier flange portion 231b is provided between the second sun gear 21 and the rear cover 63 as viewed in the axial direction. The pinion shafts 232 support the first and second pinion gears 24, 25, such that these pinion gears can freely rotate, and one end portion of each pinion shaft 232 is attached to the carrier flange portion 231b, while the other end portion is attached to the carrier plate 233. The carrier plate 233 is located on the side opposite to the carrier flange portion 231b, relative to the pinion shafts 232 and the first and second pinion gears 24, 25.

The pump drive gear 71 is integrated with an outer peripheral portion of the carrier flange portion 231b; therefore, power delivered from the engine 1 is transmitted to the pump driven gear 72, via the carrier body 231. The pump driven gear 72 is mounted on a portion of the pump shaft 73 closer to the rear cover 63, and rotates as a unit with a pump rotor 74 attached to a portion of the pump shaft 73 closer to the engine 1. The pump rotor 74 is provided within a pump body 75.

The notch plate 32 of the SOWC 30 is spline-fitted on the outer periphery of the second ring gear 22. The SOWC 30 is an annular gear lock mechanism, and is provided on the radially outer side of the second planetary gear train 20. The SOWC 30 includes the pocket plate 31, notch plate 32, and a selector plate 33, which are arranged side by side in the axial direction of the second ring gear 22, and a plurality of struts 34 as engaging pieces. The selector plate 33 is a member that switches the SOWC 30 between the locking state and the non-locking state. The pocket plate 31 is fastened by bolts 65 to the center support 80, and is supported by the case body 61 via the center support 80. The pocket plate 31 is provided with a plurality of pockets that receive the struts 34 that engage with the notch plate 32. The pockets are formed in portions of the pocket plate 31 which are opposed to the notch plate 32 and the selector plate 33 in the axial direction. The struts 34 are provided at positions that are spaced at given intervals in the circumferential direction of the pocket plate 31. The notch plate 32 is provided with a plurality of notches as engaging recessed portions that engage with the struts 34, at circumferential positions corresponding to the struts 34. The selector plate 33 is a disc-shaped plate member disposed between the notch plate 32 and the pocket plate 31, and is provided with a plurality of windows (not shown) which permit the struts 34 on the pocket plate 31 side to protrude toward the notch plate 32. Further, an actuator (not shown) is coupled to the selector plate 33 via an arm 35. When force delivered from the actuator is transmitted to the selector plate 33 via the arm 35, the selector plate 33 rotates relative to the pocket plate 31 and the notch plate 32. In this manner, the SOWC 30 can be switched between the locking state and the non-locking state. For example, if the selector plate 33 is placed at a given rotational position, such that the struts 34 are pushed by plate portions of the selector plate 33, into the pockets on the pocket plate 31 side, the pocket plate 31 and the notch plate 32 are brought into a non-engaged state, and therefore, the SOWC 30 is placed in the non-locking state, thus allowing the SOWC 30 to rotate in both directions. On the other hand, if the selector plate 33 is rotated from the rotational position of the non-locking state, and is brought into a condition where the struts 34 rise toward the notch plate 32, through the windows of the selector plate 33, the pocket plate 31 and the notch plate 32 are brought into an engaged state, and the SOWC 30 is placed in the locking state, so that the rotational direction is restricted to one direction. An elastic member (not shown) that biases each of the struts 34 toward the notch plate 32 is provided between the strut 34 and a bottom of the corresponding pocket.

An oil catch tank 61a is provided in an upper portion of the interior of case 60. The oil catch tank 61a is an oil reservoir in which ATF (Automatic Transmission Fluid) as a lubricant can be temporarily stored. The ATF that remains in a lower portion of the interior of the case 60 is stirred up by rotation of gears that constitute the counter gear mechanism 40, etc. in the case 60, and fed to the oil catch tank 61a. A part of the ATF stored in the oil catch tank 61a flows out through an outlet 61b that communicates with the interior of the oil catch tank 61a.

Figure 3:
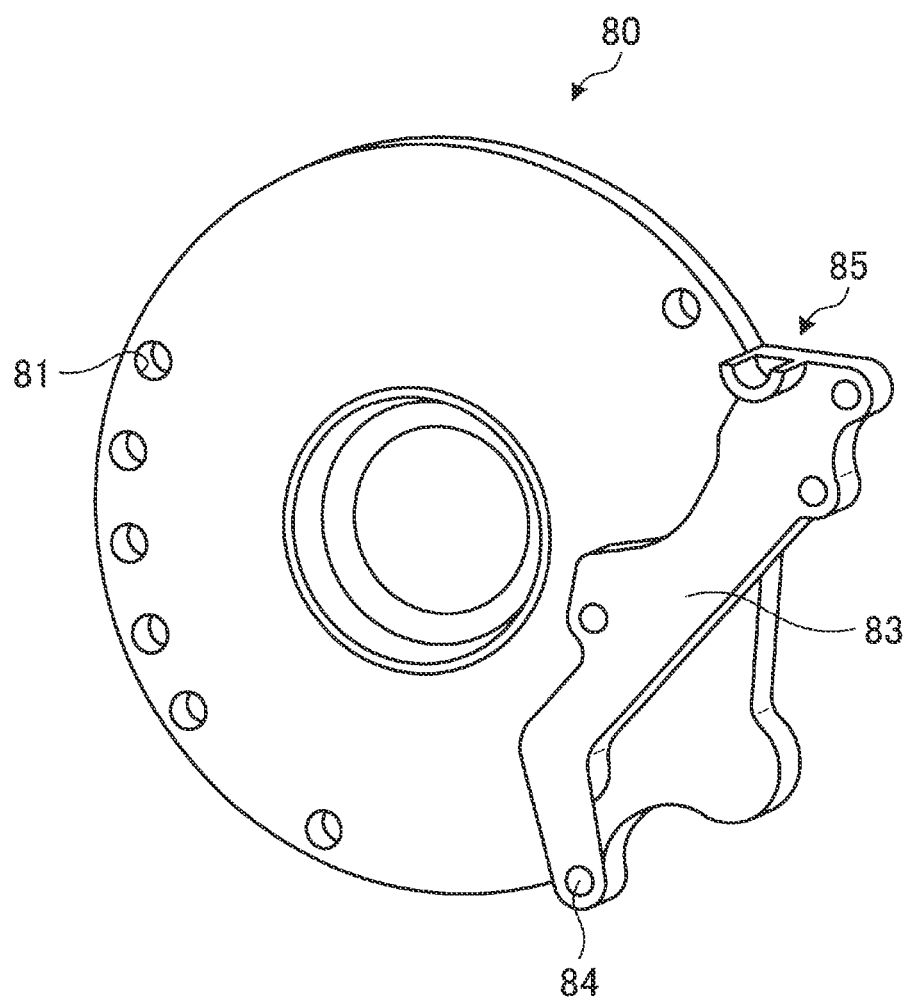
FIG. 3 is a schematic perspective view of a center support.

Next, a lubricating structure for the SOWC 30 and a lubricant passage in the lubricating structure will be specifically described with reference to FIG. 2 and FIG. 3. FIG. 3 is a schematic perspective view of the center support 80 as viewed from the engine 1 side.

As shown in FIG. 3, the center support 80 is provided with a plurality of bolt holes 81 with which the center support 80 is bolted to the case body 61. As shown in FIG. 2, a groove 82 is formed in a surface of the center support 80 which faces the engine 1. Also, a plate member 83 is attached to the center support 80 with bolts 84, such that the groove 82 is oil-tightly covered with the plate member 83.

As shown in FIG. 2 and FIG. 3, the center support 80 is provided with a semicylindrical lubricant receiving portion 85, which is adapted to receive the ATF flowing from the outlet 61b. Further, as shown in FIG. 2, in the center support 80, a lubricant inlet 86 that communicates with the groove 82 is provided in the semicylindrical bottom of the lubricant receiving portion 85. On the other hand, a lubricant outlet 87 is formed in the bottom of the groove 82 of the center support 80, as shown in FIG. 2. The lubricant outlet 87 extends toward the SOWC 30, and is connected to a through-hole 31a formed in the pocket plate 31 of the SOWC 30. The through-hole 31a extends through the pocket plate 31 from the engine 1 side toward the selector plate 33 side (namely, toward the inside of the SOWC 30).

The lubricant inlet 86, groove 82 plate member 83, and the lubricant outlet 87 cooperate to form a lubricant passage. In the lubricating structure for the SOWC 30, the ATF that has flowed through the oil catch tank 61a and the outlet 61b passes through the lubricant receiving portion 85, lubricant passage, and the through-hole 31*a*, in this order, to be supplied to the SOWC 30.

Figure 4:
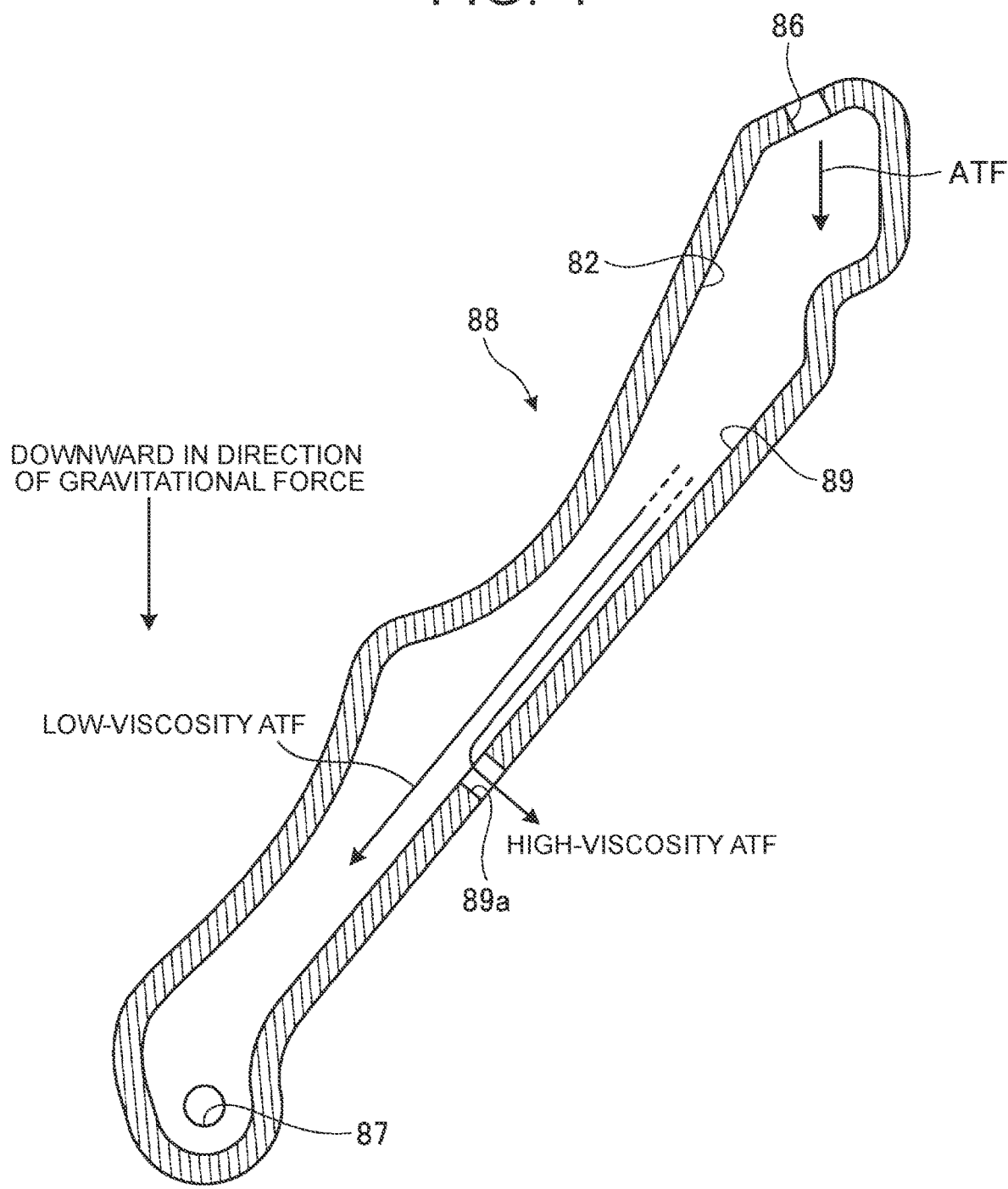
FIG. 4 is a schematic view useful for explaining a lubricant passage.

FIG. 4 is a schematic view useful for explaining the lubricant passage 88, and is a cross-sectional view taken along a plane that is in parallel with the plate member 83 and passes the groove 82.

As shown in FIG. 4, the lubricant outlet 87 is located on the lower side of the lubricant inlet 86 in the direction of gravitational force. Also, an inclined surface 89 is provided on the lower side of the lubricant inlet 86 in the direction of gravitational force, between the lubricant inlet 86 and the lubricant outlet 87. The inclined surface 89 is inclined with respect to the direction of gravitational force, and is formed with an opening 89*a* that communicates with the outside of the lubricant passage 88. While the shape of the opening 89*a* is circular in the first embodiment, it is not particularly limited, and may be polygonal, for example.

As describe above, the ATF that has flowed through the oil catch tank 61*a* and the outlet 61*b* flows through the lubricant passage 88, via the lubricant inlet 86, inclined surface 89, and the lubricant outlet 87. More specifically, the ATF flows in from the lubricant inlet 86, drops as indicated by an arrow labeled with "ATF" in FIG. 4, and flows along the inclined surface 89.

In the case where the ATF has a low temperature and a high viscosity, such as where the engine 1 is started, when the high-viscosity ATF flows along the inclined surface 89 and reaches the opening 89*a*, the ATF flows along an inner wall of the opening 89*a*, as indicated by an arrow labeled with "HIGH-VISCOSITY ATF", due to its high viscosity, and is discharged outside of the lubricant passage 88, through the opening 89*a*. On the other hand, in the case where the ATF has a temperature of a normal traveling condition and a low viscosity, after the engine 1 is started, when the low-viscosity ATF flows from the lubricant inlet 86, flows along the inclined surface 89, and reaches the opening 89*a*, the ATF passes over the opening 89*a* as indicated by an arrow labeled with "LOW-VISCOSITY ATF" due to its low viscosity, reaches the lubricant outlet 87, and is supplied to the inside of the SOWC 30 connected to the lubricant outlet 87. As a result, the low-viscosity ATF is supplied to the inside of the SOWC 30, while the high-viscosity ATF is significantly restricted from being supplied to the inside of the SOWC 30; therefore, it is possible to reduce the possibility of erroneous engagement of the SOWC 30 while lubricating the SOWC 30.

Next, a lubricating structure for the SOWC according to a second embodiment will be described. The second embodiment is different from the first embodiment only in the configuration of the lubricant passage in the lubricating structure, but these embodiments are identical with each other in terms of the configuration of other parts of the lubricating structure, and the configuration of the vehicle in which the lubricating structure is provided. Thus, in the following, only the lubricant passage will be described for the sake of omission of repeated description.

Figure 5:
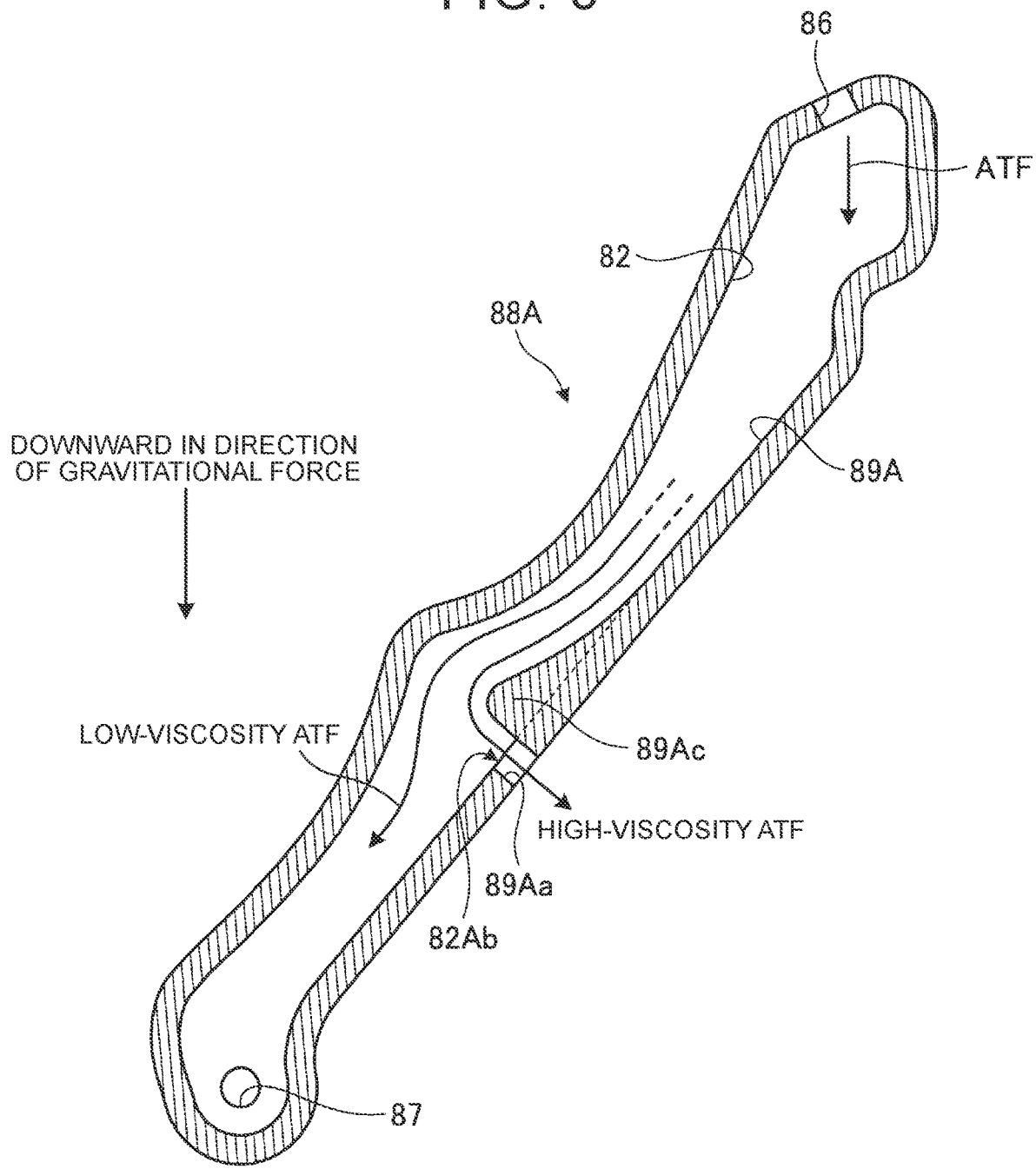
FIG. 5 is a schematic view useful for explaining a lubricant passage in a lubricating structure for a selectable one-way clutch according to a second embodiment.

FIG. 5 is a schematic view useful for explaining the configuration of the lubricant passage in the lubricating structure for the SOWC according to the second embodiment. The lubricant passage 88A of the second embodiment is different from the lubricant passage 88 of the first embodiment, in that a first protruding portion 89AC is formed on the inclined surface 89A (corresponding to the inclined surface 89 of the first embodiment), on one side of the opening 89Aa (corresponding to the opening 89*a* of the first embodiment) closer to the lubricant inlet 86. The first protruding portion 89Ac protrudes from an opening end 89Ab of the opening 89Aa, toward the inside of the lubricant passage 88A (namely, the inside of the groove 82). The first protruding portion 89Ac is formed in the vicinity of the opening end 89Ab of the opening 89Aa. The first protruding portion 89Ac has a triangular shape in cross-section, and has a projecting distal end in the form of a rounded corner. One side of the first protruding portion 89Ac closer to the lubricant inlet 86 is longer than another side of the portion 89Ac closer to the lubricant outlet 87.

In the lubricant passage 88A, the high-viscosity ATF flows from the lubricant inlet 86, drops as indicated by an arrow labeled with "ATF" in FIG. 5, and flows along the inclined surface 89A. Then, the high-viscosity ATF flows along the first protruding portion 89Ac as indicated by an arrow labeled with "HIGH-VISCOSITY ATF", to be guided to the opening 89Aa, and is discharged to the outside of the lubricant passage 88A through the opening 89Aa. Thus, the high-viscosity ATF is more likely to be discharged from the opening 89Aa. On the other hand, the low-viscosity ATF passes over the opening 89Aa, after flowing along the first protruding portion 89Ac as indicated by an arrow labeled with "LOW-VISCOSITY ATF", then drops onto the inclined surface 89A, and flows along the inclined surface 89A again until it reaches the lubricant outlet 87. Thus, the low-viscosity ATF is less likely or unlikely to be discharged from the opening 89Aa; therefore, a larger amount of the low-viscosity ATF is supplied to the inside of the SOWC 30. The first protruding portion 89Ac may be located close to the opening end 89Ab of the opening 89Aa, to such an extent that the low-viscosity ATF can pass over the opening 89Aa, according to the shape of the first protruding portion 89Ac, the shape of the opening 89Aa, characteristics of the ATF when its viscosity is low, and so forth. The first protruding portion 89Ac is preferably shaped so that the low-viscosity ATF can easily pass over the opening 89Aa.

Figure 6:
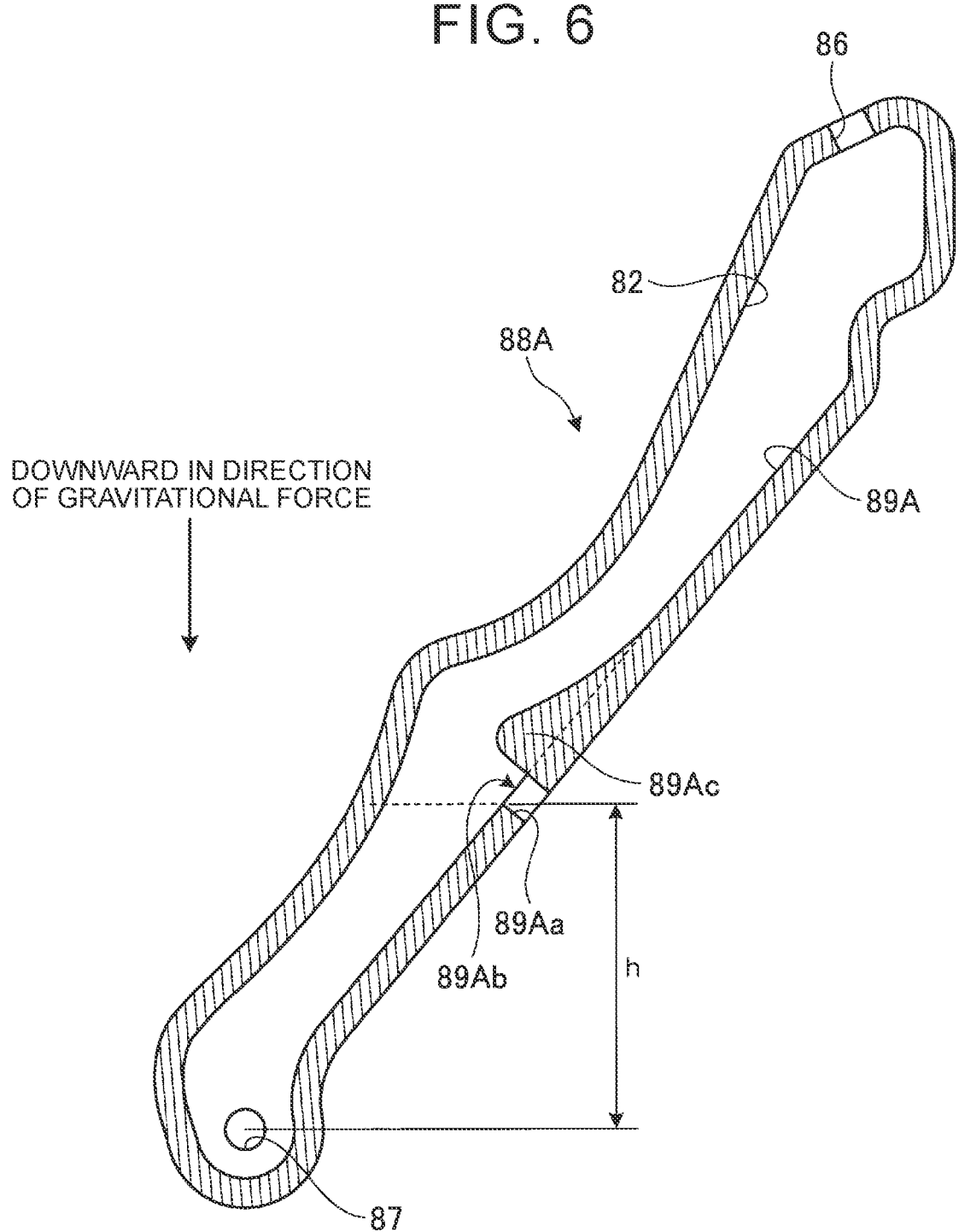
FIG. 6 is a view useful for explaining the position of an opening of the lubricant passage in the second embodiment.

Referring now to FIG. 6, a preferable position of the opening 89Aa of the lubricant passage 88A in the direction of gravitational force in the second embodiment will be explained. In a condition where a sufficient amount of the low-viscosity ATF is supplied from the lubricant inlet 86, the low-viscosity ATF is accumulated in a portion of the lubricant passage 88A from the lubricant outlet 87 to the opening end 89Ab of the opening 89Aa located closest to the lubricant outlet 87. If the low-viscosity AFT is further supplied from the lubricant inlet 86 in this condition, it is discharged from the opening 89Aa. Accordingly, in the condition where a sufficient amount of the low-viscosity ATF is supplied, the height "h" from the lubricant outlet 87 to the opening end 89Ab of the opening 89*a* closest to the lubricant outlet 87 in the direction of gravitational force provides a pressure head, and a hydraulic pressure is generated in the low-viscosity ATF thus accumulated. This hydraulic pressure promotes supply of the low-viscosity ATF into the inside of the SOWC 30. This hydraulic pressure can be obtained by using characteristics, such as the density, of the low-viscosity ATF, the shape of the lubricant passage 88A, etc.

In the meantime, when the pocket plate 31 and the notch plate 32 are in a non-engaged or disengaged state in the SOWC 30, the pocket plate 31 and the notch plate 32 rotate relative to each other; therefore, centrifugal force acts on the ATF that exists within the SOWC 30, in particular, between the pocket plate 31 and the notch plate 32, due to a difference between their rotational speeds, and a hydraulic pressure is generated. This hydraulic pressure may be called "centrifugal hydraulic pressure". Since the difference between the rotational speeds varies depending on the operating state of the SOWC 30, the centrifugal hydraulic pressure also varies depending on the operating state of the SOWC 30, and the centrifugal hydraulic pressure increases as the difference between the rotational speeds is larger. The centrifugal hydraulic pressure can be obtained by using the difference between the rotational speeds, distance between the pocket plate 31 and the notch plate 32, and characteristics, such as the viscosity, of the low-viscosity ATF, for example.

The centrifugal hydraulic pressure provides resistance fore when the ATF is supplied from the lubricant passage 88A into the SOWC 30. Thus, the height "h" is preferably set so that the hydraulic pressure produced by the ATF accumulated in the lubricant passage 88A becomes larger than the maximum level of the centrifugal hydraulic pressure in the SOWC 30. In this case, even when the maximum level of the hydraulic pressure is generated within the SOWC 30, the low-viscosity ATF accumulated in the lubricant passage 88A is likely to be supplied into the SOWC 30.

The above-described manner of setting the position of the opening in the direction of gravitational force may be applied to the lubricant passage of the above first embodiment, and a lubricant passage of a third embodiment as described below.

Next, a lubricating structure for the SOWC according to the third embodiment will be described. The third embodiment is different from the second embodiment only in the configuration of the lubricant passage in the lubricating structure, but these embodiments are identical with each other in terms of the configuration of other parts of the lubricating structure, and the configuration of the vehicle in which the lubricating structure is provided. Thus, in the following, only the lubricant passage will be described for the sake of omission of repeated description.

Figure 7:
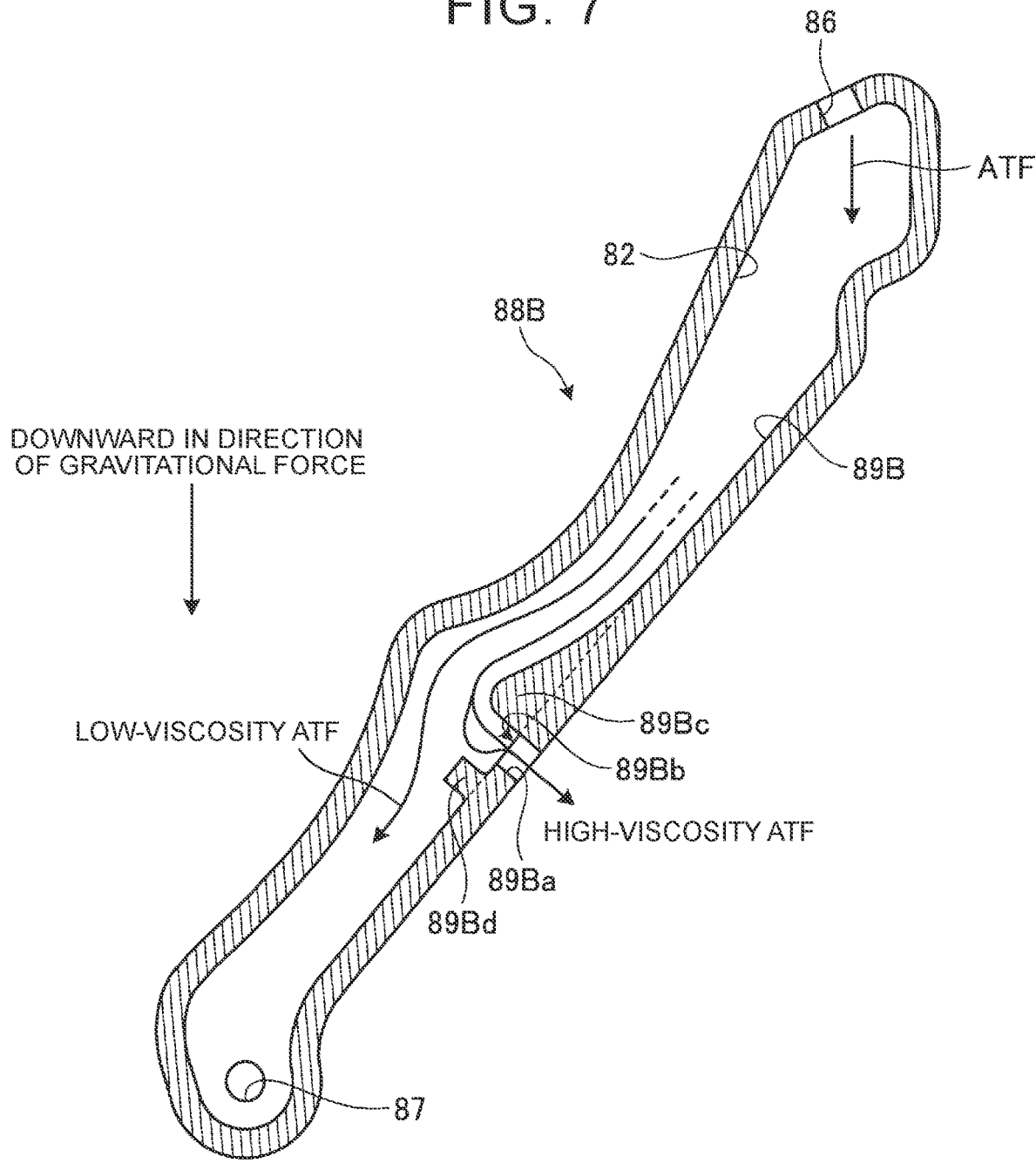
FIG. 7 is a schematic view useful for explaining a lubricant passage in a lubricating structure for a selectable one-way clutch according to a third embodiment.

FIG. 7 is a schematic view useful for explaining the configuration of the lubricant passage in the lubricating structure for the SOWC according to the third embodiment. In the lubricant passage 88B of the third embodiment, too, a first protruding portion 89Bc (corresponding to the first protruding portion 89Ac of the second embodiment) is formed on an inclined surface 89B (corresponding to the inclined surface 89A of the second embodiment). However, the lubricant passage 88B is different from the lubricant passage 88A of the second embodiment in that a second protruding portion 89Bd having a rectangular shape in cross-section is formed on the inclined surface 89B, on one side of the opening 89Ba (corresponding to the opening 89Aa of the second embodiment) closer to the lubricant outlet 87. The second protruding portion 89Bd protrudes from the opening end 89Bb of the opening 89Ba, toward the inside of the lubricant passage 88B (namely, the inside of the groove 82). The second protruding portion 89Bd is formed in the vicinity of the opening end 89Bb of the opening 89Ba, and has a rectangular shape in cross-section.

In the lubricant passage 88B, the low-viscosity ATF flows from the lubricant inlet 86, drops as indicated by an arrow labeled with "ATF" in FIG. 7, and flows along the inclined surface 89B. Then, after flowing along the first protruding portion 89Bc as indicated by an arrow labeled with "LOW-VISCOSITY ATF", the low-viscosity ATF passes over the opening 89Ba, then drops onto the inclined surface 89B, and flows along the inclined surface 89B again, until it reaches the lubricant outlet 87. Thus, the low-viscosity ATF is less likely or unlikely to be discharged from the opening 89Ba; therefore, a larger amount of the low-viscosity ATF is supplied into the SOWC 30. On the other hand, the high-viscosity ATF flows along the first protruding portion 89Bc, as indicated by an arrow labeled with "HIGH-VISCOSITY ATF", to be guided to the opening 89Ba, and is discharged outside of the lubricant passage 88B, through the opening 89Ba. Thus, the high-viscosity ATF is likely to be discharged from the opening 89Ba. Further, even if a part of the high-viscosity ATF passes over the opening 89Ba, the high-viscosity ATF that has passed the opening 89Ba is blocked and retained by the second protruding portion 89Bd, and is less likely to be supplied into the SOWC 30. Since the second protruding portion 89Bd is formed in the vicinity of the opening end 89Bb of the opening 89Ba, a part of the high-viscosity ATF blocked and retained by the second protruding portion 89Bd is discharged from the opening 89Ba. The second protruding portion 89Bd may be located close to the opening end 89Bb of the opening 89Ba, to such an extent that a part of the high-viscosity ATF thus blocked and retained is discharged from the opening 89Ba, according to the shape of the first protruding portion 89Bc, the shape of the opening 89Ba, and characteristics of the ATF when its viscosity is high, for example.

Figure 8:
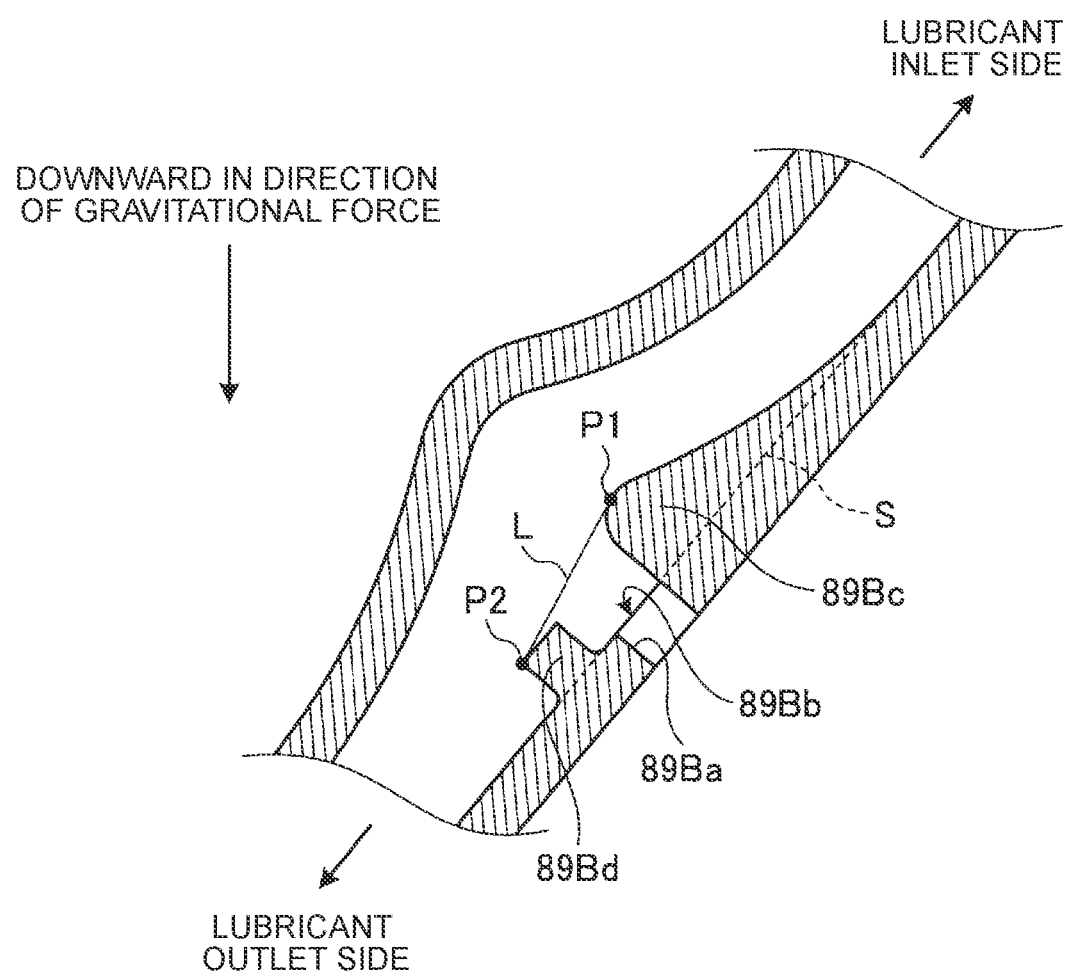
FIG. 8 is a schematic view useful for explaining the relationship between a first protruding portion and a second protruding portion.

Referring to FIG. 8, the relationship between the first protruding portion 89Bc and the second protruding portion 89Bd in the third embodiment will be described. Plane "S" including the opening end 89Bb of the opening 89Ba is specified for the sake of explanation. A distal end of the first protruding portion 89Bc will be referred to as "distal end P1". Here, the distal end P1 of the first protruding portion 89Bc is a position in the first protruding portion 89Bc at which the height from the opening end 89Bb of the opening 89Ba (namely, the distance from the plane S) is maximized. Also, a distal end of the second protruding portion 89Bd will be referred to as "distal end P2". Here, the distal end P2 of the second protruding portion 89Bd is a position in the second protruding portion 89Bd at which the height from the opening end 89Bb of the opening 89Ba (namely, the distance from the plane S) is maximized. While there are two or more locations corresponding to the distal end in the second protruding portion 89Bd having a rectangular shape, one of these positions which is farthest from the opening end 89Bb is specified as the distal end P2. At this time, the distance between the distal end P2 and the plane S is smaller than the distance between the distal end P1 and the plane S. In this case, line L that connects the distal end P1 with the distal end P2 is inclined such that the distance between the line L and the plane S is reduced from the lubricant inlet 86 side to the lubricant outlet 87 side. Thus, when the distance between the distal end P2 and the plane S is smaller than the distance between the distal end P1 and the plane S, the low-viscosity ATF that has passed over the opening 89Ba is less likely to collide with the second protruding portion 89Bd. As a result, a larger amount of the low-viscosity ATF is supplied to the SOWC 30.

It is to be understood that the disclosure is not limited to the above embodiments, and that the disclosure includes other structures constituted by a suitable combination of the constituent elements as described above. Also, further effects and modified examples can be easily derived by those skilled in the art. Thus, a wide range of embodiments of this disclosure are not limited to the above embodiments, but the disclosure may be changed in various ways.

What is claimed is:

1. A lubricating structure comprising:
   a selectable one-way clutch including a pocket plate, a notch plate, and a selector plate, the pocket plate being attached to a case, the notch plate being attached to a rotating member connected to an output shaft of a power source of a vehicle, the selector plate being provided between the pocket plate and the notch plate, the selector plate being configured to rotate so as to switch the selectable one-way clutch between an engaged state and a non-engaged state, the engaged state being a state in which torque is transmitted between the pocket plate and the notch plate, the non-engaged state being a state in which torque is not transmitted between the pocket plate and the notch plate, the pocket plate, the notch plate, and the selector plate being arranged side by side in an axial direction of the rotating member; and a lubricant passage through which a lubricant is supplied to the selectable one-way clutch, the lubricant passage having a lubricant inlet and a lubricant outlet, the lubricant outlet being located on a lower side of the lubricant inlet in a direction of gravitational force, and connected to an inside of the selectable one-way clutch, the lubricant passage including an inclined surface between the lubricant inlet and the lubricant outlet, the inclined surface being inclined with respect to the direction of gravitational force, the inclined surface having an opening, and the inclined surface being fixed to the case, wherein the lubricant flows along the inclined surface, and is discharged outside of the lubricant passage through the opening.

2. The lubricating structure according to claim 1, wherein the lubricant passage is provided with a first protruding portion in the vicinity of an opening end of the opening, the first protruding portion protruding from the inclined surface on one side of the opening closer to the lubricant inlet, toward an inside of the lubricant passage.

3. The lubricating structure according to claim 2, wherein:

the lubricant passage is provided with a second protruding portion in the vicinity of the opening end of the opening, the second protruding portion protruding from the inclined surface on the other side of the opening closer to the lubricant outlet, toward the inside of the lubricant passage; and a distance between a plane and a distal end of the second protruding portion is smaller than a distance between the plane and a distal end of the first protruding portion, the plane includes the opening end of the opening.

4. The lubricating structure according to claim 1, wherein a height from the lubricant outlet to an opening end of the opening which is closest to the lubricant outlet as measured in the direction of gravitational force is set such that a first hydraulic pressure value is larger than a second hydraulic pressure value, the first hydraulic pressure value is a value of a hydraulic pressure generated by the lubricant accumulated between the lubricant outlet and the opening in the lubricant passage, the second hydraulic pressure value is a maximum value of the hydraulic pressure of the lubricant generated within the selectable one-way clutch, due to a difference between a rotational speed of the pocket plate and a rotational speed of the notch plate when the selectable one-way clutch is in the non-engaged state.

5. A lubricating structure comprising:

a selectable one-way clutch including a pocket plate, a notch plate, and a selector plate, the pocket plate being attached to a case, the notch plate being attached to a rotating member connected to an output shaft of a power source of a vehicle, the selector plate being provided between the pocket plate and the notch plate, the selector plate being configured to rotate so as to switch the selectable one-way clutch between an engaged state and a non-engaged state, the engaged state being a state in which torque is transmitted between the pocket plate and the notch plate, the non-engaged state being a state in which torque is not transmitted between the pocket plate and the notch plate, the pocket plate, the notch plate, and the selector plate being arranged side by side in an axial direction of the rotating member; and a lubricant passage through which a lubricant is supplied to the selectable one-way clutch, the lubricant passage having a lubricant inlet and a lubricant outlet, the lubricant outlet being located on a lower side of the lubricant inlet in a direction of gravitational force, and connected to an inside of the selectable one-way clutch, the lubricant passage including an inclined surface between the lubricant inlet and the lubricant outlet, the inclined surface being inclined with respect to the direction of gravitational force and having an opening, and the inclined surface being fixed to the case, wherein the lubricant passage includes:

a first lubricant passage in which the lubricant enters the lubricant inlet, passes along the inclined surface, and is discharged outside of the lubricant outlet; and a second lubricant passage in which the lubricant enters the lubricant inlet, passes along the inclined surface, and is discharged out of the lubricant passage through the opening.

* * * * *